United States Patent [19]

Hay et al.

[11] 4,048,143

[45] Sept. 13, 1977

[54] PROCESS FOR CAPPING POLYPHENYLENE OXIDE

[75] Inventors: Allan S. Hay; Dwain M. White, both of Schenectady, N.Y.

[73] Assignee: General Electric Company, Schenectady, N.Y.

[21] Appl. No.: 613,072

[22] Filed: Sept. 15, 1975

Related U.S. Application Data

[63] Continuation of Ser. No. 441,294, Feb. 11, 1974, abandoned.

[51] Int. Cl.$^2$ .................. C08G 65/44; C08G 65/48
[52] U.S. Cl. .................. 260/47 ET; 260/49
[58] Field of Search .................. 260/47 ET, 49

[56] References Cited

U.S. PATENT DOCUMENTS

| | | | |
|---|---|---|---|
| 3,375,228 | 3/1968 | Holoch et al. | 260/47 |
| 3,392,146 | 7/1968 | Anderson et al. | 260/47 |
| 3,402,143 | 9/1968 | Hay | 260/47 |
| 3,424,722 | 1/1969 | Jerussi et al. | 260/47 |
| 3,535,281 | 10/1970 | Hay | 260/47 |
| 3,573,254 | 3/1971 | Factor | 260/47 |

OTHER PUBLICATIONS

Starks, J. Am. Chem. Soc. 93, 195–199 (1971).

*Primary Examiner*—Lester L. Lee
*Attorney, Agent, or Firm*—F. Wesley Turner; Joseph T. Cohen; Jerome C. Squillaro

[57] ABSTRACT

A process is disclosed which provides for the reduction of the occurrence of oxidative and/or thermal degradation of polyphenylene oxides by contacting the oxides with a capping agent in the presence of a water soluble base, a catalytic phase transfer agent, and, optionally, an effective organic phase reducing agent. The resulting capped polyphenylene oxides can be used to prepare improved articles of manufacture using conventional techniques such as molding, vacuum forming, extrusion, etc.

8 Claims, No Drawings

PROCESS FOR CAPPING POLYPHENYLENE OXIDE

This is a continuation of application Ser. No. 441,294, filed Feb. 11, 1974 and now abandoned.

The process of this invention relates to the reduction in the ease of oxidative and/or thermal degradation of polyphenylene oxides by contacting the latter with a capping agent in the presence of a water soluble base, a catalytic phase transfer agent, and, optionally, an effective organic phase reducing agent. More particularly, this invention comprises contacting a polyphenylene oxide with a capping agent selected from the class consisting of monoacyl halides of the formula

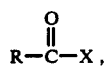

hydrocarbon monosulfonyl halides of the formula R—SO$_2$—X, anhydrides of monocarboxylic acids of the formula

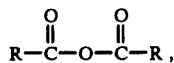

alkyl halides of the formula R—X, dialkyl sulfates of the formula R—O—SO$_2$—O—R, wherein R is alkyl, cycloalkyl, aryl or mixtures thereof, X is chlorine, bromine, fluorine or iodine, wherein said contacting is carried out in the presence of (1) a water soluble base selected from the class consisting of alkali metal and alkaline earth metal bases, (2) a catalytic phase transfer agent, and, optionally, (3) an effective organic phase reducing agent.

Polyphenylene oxides comprise an interesting group of new polymers which are disclosed in U.S. Pat. Nos. 3,306,874, 3,306,875 and 3,432,466, all assigned to the same assignee as the present invention which are incorporated herein by reference. In general, these polyphenylene oxides are homopolymers or copolymers of poly(2,6-disubstituted-1,4-phenylene oxide)s which are made by oxidatively coupling of 2,6-disubstituted phenols.

To date, the prior art has employed various means of stabilizing polyphenylene oxides against oxidative and thermal degradation including the methods described in U.S. Pat. Nos. 3,375,228, 3,402,143, 3,535,281 and 3,573,254, all assigned to the same assignee as the present invention. As disclosed by the prior art means which provide, in part or total, oxidative and/or thermal stability to polyphenylene oxides are desirable in order to prevent substantial oxidative attack upon polyphenylene oxide, thus avoiding substantial discoloration and/or embrittlement of the oxides when processed at elevated temperatures into useful articles of manufacture.

An object of this invention is to provide polyphenylene oxides which have improved color characteristics. Another object is to provide an economic process for capping polyphenylene oxides. These and other objects will be readily apparent from the following specification and the appended claims.

In essence, process of our invention comprises contacting a polyphenylene oxide with a capping agent selected from monoacyl halides, monosulfonyl halides, anhydrides of monocarboxylic acids, alkyl halides, or dialkyl sulfates wherein the contacting is carried out in the presence of (1) a water soluble base, (2) a catalytic phase transfer agent, and, optionally, (3) an effective organic phase reducing agent.

In general, the capping agents that are employed in the practice of this invention are defined herein as compounds which will react with a phenolic hydroxyl group with subsequent formation of a bond between the oxygen atom of the phenolic group and a hydrocarbylcarbonyl group, a hydrocarbylsulfonyl group, a hydrocarbylcarbonyl group, a hydrocarbyl group, a hydrocarbyloxysulfonyl group, derived from monoacyl halides, monosulfonyl halides, anhydrides of monocarboxylic acids, alkyl halides, and dialkyl sulfates, respectively.

Representative of useful capping agents falling within the above definitions are the following:

A. monoacyl halides of the formula:

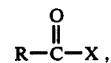

B. monosulfonyl halides of the formula: R—SO$_2$—X,
C. anhydrides of monocarboxylic acids of the formula

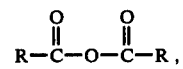

D. alkyl halides of the formula R—X, and
E. dialkylsulfates of the formula R—O—SO$_2$—O—R, wherein the above formulas R is alkyl, cycloalkyl, aryl or mixtures thereof, such as alkaryl, alkcycloalkyl, aralkyl, arcycloalkyl, cycloalkaryl, etc., and X is chlorine, bromine, fluorine or iodine. Preferably, the R groups contain from about 1 to about 30 carbon atoms, and more preferably contain from about 1 to about 20 carbon atoms. Representative examples of specific capping agents include:

1. monoacyl halides, such as acetyl fluoride, acetyl chloride, acetyl bromide, propionyl halides, butyryl halides, stearoyl halides, benzoyl halides, toluoyl halides, naphthoyl halides, cinnamoyl halides, etc.;

2. monosulfonyl halides, such as methanesulfonyl halides, benzenesulfonyl halides, toluenesulfonyl halides, xylene sulfonyl halides, etc.;

3. anhydrides of monocarboxylic acids, such as acetic anhydride, propionic anhydride, octanoic anhydride, benzoic anhydride, toluic anhydride, butyric anhydride, pivalic anhydride, m-dichlorobenzoic anhydride, 2,3,4,5,6-tentachlorobenzoic anhydride, pentaoic anhydride, palmatoic anhydride, stearic anhydride, etc.;

4. alkyl halides, such as: methylchloride, methylbromide, methyliodide, isopropyl halides, amyl halides, hexadecyl halides, cyclopentyl halides, 1-halo-1, 3-dimethylcyclopentanes, diphenyldihalomethanes, triphenyl halomethanes, etc.; and 5. dialkylsulfates, such as: dimethyl sulfate, diethyl sulfate, dibutyl sulfate, diisoamyl sulfate, dicyclohexyl sulfate, didodecyl sulfave, di(octadecyl)sulfate, etc. As pointed out by the foregoing specific examples, the particular capping agent employed is not critical, since any agent which is capable of reacting with phenolic hydroxyl groups which improves the oxidative and/or thermal stability of the resulting groups can be employed. A presently preferred capping agent is acetic anhydride since it is a readily available inexpensive capping agent.

The catalytic phase transfer agents which can be employed comprise any compounds which are soluble in the organic phase of a polyphenylene oxide reaction mixture. Among the catalytic phase transfer agents which are suitable are those selected from the group consisting of quaternary ammonium compounds, quaternary phosphonium compounds and tertiary sulfonium compounds, or mixtures thereof. These compounds can be described as the ammonium, phosphonium and sulfonium salts having the respective formulas:

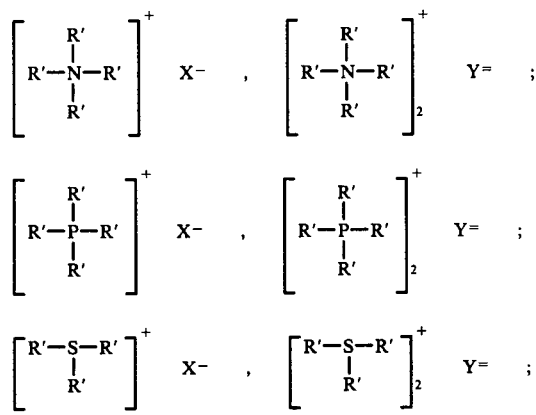

wherein each R' is independently selected from aliphatic hydrocarbon radicals having from about 1 to about 30 carbon atoms, preferably from about 2 to about 15 carbon atoms, each X− is selected from the group consisting of Cl−, Br−, F−, $CH_3SO_3^-$, $CH_3CO_2^-$, $CF_3CO_2^-$ or OH−, and each Y= is selected from the group consisting of $SO_4^=$, $CO_3^=$, or $C_2O_4^=$.

These onium compounds can be prepared by methods well-known in the art which include the familiar addition reactions of tertiary aliphatic amines, tertiary aliphatic phosphines and aliphatic sulfides with aliphatic halides.

The water soluble base can be any water soluble base which can be dissolved in the aqueous phase of the polyphenylene oxide reaction mixture in amounts adequate to provide sufficient hydroxyl groups within the organo phase to form an alkali metal or alkaline earth metal cation phenoxide. Preferably, the bases that are employed are those that are very soluble in an aqueous media. Among the water soluble base compounds that can be employed are alkali metal or alkaline earth metal hydroxides and carbonates. Specific examples include compounds such as potassium hydroxide, sodium hydroxide, sodium monocarbonate, barium carbonate, etc.

In general, our process comprises contacting a polyphenylene oxide reaction product mixture and a catalytic phase transfer agent in the presence of a water soluble base, wherein the contacting is carried out in time periods and in the presence of amounts of water soluble base and catalytic phase transfer agent sufficient to react with any phenolic hydroxyl group and form a resulting alkali or alkaline earth metal phenoxide group. The addition of the catalytic phase transfer agent to the polyphenylene oxide reaction mixture can be either carried out before, during or after polymerization of the disubstituted phenol to polyphenylene oxide. In a preferred embodiment of this invention, the catalytic phase transfer agent is employed in the form of an in situ prepared effective organic phase reducing agent which contains cations selected from quaternary ammonium, quaternary phosphonium and tertiary sulfonium ions and an anion selected from dithionite, dithiosulfate and borohydride ions in accordance with the concepts described by D. M. White, in U.S. patent application Ser. No. 649,981, filed Jan. 29, 1976, a continuation-in-part of Ser. No. 431,129, filed Jan. 7, 1974, now abandoned, assigned to the same assignee as the assignee of this invention which is hereby incorporated herein by reference. Representative of effective organic phase reducing agents are such compounds as tetramethylammonium dithionite, tricaprylmonomethylammonium dithionite, trimethylsulfonium borohydride, tetrapropylammonium dithiosulfate, etc., and mixtures thereof. In general, in carrying out the process, it is preferred that the catalytic transfer agent, and/or effective organic phase reducing agent, water soluble base and capping agent contact the polyphenylene oxide reaction mixtures at temperatures wherein the capping agents are not susceptible to significant thermal or hydrolytic degradation. Accordingly, it is preferred that our process, including the in situ preparation of an effective organic phase reducing agent, be carried out within the temperature range of from about 0° C. to about 100° C. and even more preferably from about 15° C. to about 80° C.

In general, the proportions of catalytic phase transfer agent to water soluble base (hereafter sometimes referred to as CPTA and WSB, respectively) employed to convert the hydroxyl associated with polyphenylene oxide reaction product groups to metal alkoxide groups can vary widely. For example, suitable molar proportions of CPTA:WSB are generally within the range of from about 1:10 to about 1:1000, and more preferably from about 1:100 to about 1:1000.

Molar proportions of capping agent (hereafter sometimes referred to as CA) to water soluble base can also vary widely. Generally, the suitable proportions of CA:WSB are within the range of from about 1:100 to about 50:1, and more preferably within the range of from about 1:10 to about 10:1.

In general, suitable molar proportions of capping agent to polyphenylene oxide, based on a polyphenylene oxide molecular weight within the range of from about 10,000 to about 50,000 and a hydroxyl group per polymer unit mole range of from about 0.5 to about 1.0, are within the range of from about 0.5:1 to about 50:1, and more preferably within the range of from about 1:1 to about 10:1. Generally, polyphenylene oxide reaction mixtures contain from about 0.01% to about 1% by weight of unreacted phenolic compounds, as well as dimers, trimers, tetramers, etc., and other low-molecular-weight oligomers. Accordingly, the molar proportions of capping agent to polyphenylene oxide, as defined based on polyphenylene oxide hereinbefore, have been established to provide sufficient capping agent molar quantities to react with substantially all of the hydroxyl groups contained by the polyphenylene oxide and any unreacted phenolic compounds, dimers, trimers, etc., and other low-molecular-weight oligomers which may constitute a portion of the polyphenylene oxide after separation from the reaction mixture.

The economic advantages of the process obtained from the use of our invention can readily be understood by a comparison of the usual prior art process and our invented process in the separation and recovery of polyphenylene oxides which are substantially resistant to oxidative and thermal degradation at elevated temperatures.

Polyphenylene oxide reaction product mixtures generally comprise dimers, trimers, polyphenylene oxide, and the other oxidation products, such as diphenoquinones, benzoquinones, etc., a solvent in which the reaction is carried out, an amine-cupric salt complex, water resulting from the oxidation step, and a small amount of methanol, (about 1%, by weight, of the total reaction mixture) which is added to solubilize the copper salt. The reaction product mixture is ordinarily diluted with additional aromatic hydrocarbon solvent, such as toluene, so that the concentration of the polyphenylene oxide ranges between 8-10%, by weight. A small amount of acetic acid is then added in order to remove the amine used in the catalyst system and to assist in the separation of the cupric salt into the aqueous methanol. A toluene solution results which contains polyphenylene oxide in combination with diphenoquinone, other quinone by-products, trimers, tetramers and other oligomers. Thereafter, large amounts of methanol are added to the toluene solution in order to precipitate the polyphenylene oxide and to extract the quinone-type by-product constituents. Thereafter, it is customary to recover the methanol leaving behind a sludge which contains the diphenoquinone by-products and monomer, dimer, trimer and other low-molecular-weight oligomers which are then discarded. As noted above, the prior art sequence requires the use of large quantities of methanol (which is difficult to separate and recover in a form suitable for subsequent reuse in the preparation of additional polyphenylene oxide) in order to obtain the polyphenylene oxide free of quinone type byproduct impurities. The characteristics of the sludge in which the diphenoquinone resides is such that it is ordinarily uneconomical to isolate the quinone by-product.

In the practice of our invention, the process for isolating polyphenylene oxide from the reaction mixture comprises the above initial process steps including, if desired, the addition of hydrocarbon solvent, such as the aforementioned toluene, so that the concentration of the polyphenylene oxide ranges between 8-10%, by weight. Thereafter, the reaction mixture is contacted preferentially with an effective organic phase reducing agent (hereafter sometimes referred to as EOPRA) such as tricaprylmonomethyl ammonium dithionite in order to reduce any oxo groups associated with diphenoquinone, and with other oxidation products of the reactant phenols, then contacted with a WSB to form alkoxide groups which can be capped. As an alternative to the aforesaid EOPRA contact, the reaction mixture can be contacted with a CPTA in the presence of a WSB in order to form suitable metal phenoxide groups of the polymer and the low-molecular-weight oligomers which are readily capped thereafter. The reaction products can be isolated from the reaction mixture by any suitable liquid-solid separation techniques, including simple, continuous or steam distillation, etc., of the polyphenylene oxide reaction mixtures. Alternatively, separation of the volatile constituents from the polyphenylene oxide reaction mixture can be carried out using direct as well as indirect drying techniques. In general, the separation is preferably carried out by heating the reaction mixtures to temperatures within the range of from about 50° to about 150° C., and more preferably within the range of from about 75° to about 125° C. Following separation of the volatile constituents from the polyphenylene oxide reaction mixture, the amine-cupric salt complexes can be separated from the reaction mixture by extraction with dilute acid either before or after the precipitation step.

As illustrated above, our process does not require the separation of diphenoquinone, trimers, tetramers, etc., in the preparation of oxidatively and thermally stable polyphenylene oxides. Elimination of the prior art alcohol extraction of by-product dimers, etc., obviates difficult and expensive alcohol separation, recovery and purification process operations.

In general, the polyphenylene oxides prepared by our preferred process, i.e. wherein the polyphenylene oxide is contacted with an effective organic phase reducing agent prior to contact with a capping agent, absorb visible light within the range of from about 4000 to about 5000 Angstrom units (metric equivalents: 400 to 500 nanometers). In general, the resulting polyphenylene oxides dissolved in benzene (0.1% concentration, 1 cm. cell) have a visible spectrum absorbance at 422 nm. of about 0.14 after a EOPRA contact, and an absorbance at 422 nm. of about 0.04 after a CA contact. For comparison, polyphenylene oxides isolated in an identical manner but without contacting EOPRA and CA have an absorbance at 422 nm. of about 1.8.

Polyphenylene oxides prepared from a process sequence which includes alcohol extraction of reaction byproducts, with subsequent contact of polyphenylene oxide contact with CPTA and a WSB, prior to an EOPRA contact with a capping agent, dissolved in benzene (0.12 concentration, 1 cm. cell) have a visible absorbance at 422 nm. of about 0.03 after an EOPRA contact, and an absorbance of a 422 nm. of about 0.03 after a CA contact.

As illustrated by the foregoing color data, the use of the preferred process of this invention which includes the use of an effective organic phase reducing agent step and a capping step provides a polyphenylene oxide which is substantially free of color, thermally and oxidatively stable and eliminates the process expense of removal of reaction byproducts by an alcohol extract process requirement.

In order that those skilled in the art may better understand the invention, the following examples are given which are illustrative of the practice of the invention, however, are not intended for the purposes of limitation. In all the examples, all parts are by weight unless otherwise stated.

EXAMPLE I

A series of acylations (capping) of commercial polyphenylene oxide reaction mixtures were carried out accordingly: a solution of 5.0 grams of polyphenylene oxide in 15 ml. of chlorobenzene was contacted with tricaprylmonomethyl ammonium chloride (Aliquat 336®)and a 50% aqueous sodium hydroxide solution. The resulting mixture was stirred vigorously, portions thereof were removed in intervals of 2, 25 and 45 minutes. Acetic anhydride was added to each portion and each mixture thereafter was stirred for 2 minutes, diluted with benzene, precipitated by the addition of methanol. The resulting polymer was washed in methanol, then with water, then again with methanol, and then dried in 80° C. and 10 Torr. In all of the test solutions, the polyphenylene oxide was a commercial sample of poly(2,6-dimethyl-1,4-phenylene oxide) having an intrinsic viscosity of 0.49 dl./g. (measured in chloroform at 25° C.) and an infrared hydroxyl absorbance at 3610 cc.$^{-1}$ of 0.092 for a 2.5% solution in carbon disulfide, $CS_2$, in a 1 cm. thick cell calibrated against $CS_2$ in a matched cell which corresponds to the polyphenylene oxide product having 0.68 nonhydrogen bonded phenolic hydroxyl groups per molecule. The product was prepared by the polymerization of 2,6-xylenol by oxidative coupling of the same in the presence of a secondary amine basic cupric complex under oxidative coupling reaction conditions. The reaction media contained in addition to the poly(2,6-dimethyl-1,4-phenylene oxide), colored by-products including 3,3',5,5'-tetramethyl-4,4'-diphenoquinone and 2,6-dimethylbenzoquinone. The results of capping the polyphenylene oxide reaction mixture, the reaction solvent, the capping agent, the catalytic transfer agent, and the water soluble base employed is set out in Table I.

TABLE I

| Run No. | Solvent[1] | Reaction Mixture (per g. of polyphenylene oxide) | | | Hydroxyl Groups Per Molecule (based on IR at 3610 cm$^{-1}$) |
| | | Capping[2] Agent | Catalytic Phase[3] Transfer Agent | Water[4] Soluble Base | |
| --- | --- | --- | --- | --- | --- |
| 1* | 3 ml** | 0.1 g. | 0.2 g. | 0.01 g. | 0.00 |
| 2 | 10 | 0.5 | 0.1 | 1.0 | 0.06 |
| 3 (control) | 10 | 0.5 | 0 | 1.0 | 0.48 |
| 4 (initial PPO) | 0 | 0 | 0 | 0 | 0.68 |

[1] toluene
[2] acetic anhydride
[3] A 75% solution of tricaprylmonomethylammonium chloride in isopropanol
[4] sodium hydroxide
*Reactants allowed to equilibrate 25 min. before acetic anhydride added
**Chlorobenzene as solvent The above data indicates complete capping of the reaction mixture was carried out in Run No. 1 under conditions where the quantity of the tricaprylmonomethylammonium chloride corresponded to only 2% by weight (0.68%, mole per mole of polymer) of the polymer and where a relatively small quantity of sodium hydroxide at high concentration in water was employed.

Run No. 2 was carried out in the presence of much larger quantities of solvent, capping agent, catalytic phase transfer agent and sodium hydroxide.

Run No. 3 carried out demonstrates the significant decrease in the effective capping of polyphenylene oxide when carried out in the absence of the catalytic phase transfer agent.

Run No. 4 defines the hydroxyl groups per molecule of the polyphenylene oxides prior to their evaluation in Run Nos. 1, 2 and 3.

EXAMPLE II

A series of cappings were carried out in a manner similar to that of Table I, Run No. 1, of Example I, wherein various equilibration times in minutes were employed before the addition of the acetic anhydride capping agent to the reactants. The polyphenylene oxide control was identical to that of Example I, Run No. 4. The effect of the equilibration time upon the degree of capping of the polyphenylene oxide is demonstrated by the data set out in Table II hereafter:

TABLE II

| Run No. | Equilibration Time (min.) | [OH] Per Polyphenylene Oxide Molecule |
| --- | --- | --- |
| 1 | 2 | 0.06 |
| 2 | 25 | 0.00 |
| 3 | 45 | 0.00 |

As illustrated by the foregoing data, the capping reaction can effectively be carried out over a very short period of time. Comparable results in capping effectiveness are obtained wherein tricaprylmonomethylammonium dithionite is substituted for tricaprylmonomethylammonium chloride in the capping evaluations of Example I, Run Nos. 1, 2 and 3 and Example II, Run Nos. 1, 2 and 3.

EXAMPLE III

This example illustrates the reduction, capping and total isolation of xylenol polymerization reaction products with catalysis of both of these steps from only a single addition of a catalytic phase transfer agent at a concentration of 0.005 g. per g. polymer. To a stirred oxygenated solution of 0.31 g. (0.00031 mole) N,N-dimethylbutylamine in 192 ml. toluene in a 3-neck flask equipped with stirrer, oxygen inlet tube and thermometer and partially immersed in a 25° stirred water bath, was added in the order listed 0.135 g. (0.00034 mole) $CuBr_2 \cdot (t-C_4H_9)NHCH_2CH_2NH(t-C_4H_9)$ and 25 g. (0.205 mole) 2,6-dimethylphenol. The mixture was stirred vigorously under oxygen for 42 minutes. At this point, two 10 ml. aliquots were removed and the polymer was isolated from them in one case by dropwise addition of 50 ml. methanol to the stirred solution followed by methanol washing of the solid and drying in a vacuum oven (sample A-1) and in the other case by adding the polymer reaction mixture to 1 liter of vigorously stirred, boiling water in a Morton flask which removed the volatile components by steam distillation and flash boiling followed by washing the solid with water and drying in a vacuum oven (sample A-2). The intrinsic viscosity of the polymer was found to be 0.5 dl./g. (chloroform, 25° C.).

To the remaining reaction mixture was added 1.13 ml. of a 10% solution of Aliquat 336® in toluene (0.5% catalytic phase transfer agent based on polymer weight). Nitrogen was bubbled through the mixture and 0.493 g. sodium dithionite was added in five portions. During this addition, two 0.25 ml. samples of water were also added. The reaction mixture turned from a deep brown to a milky white color. Two aliquots were removed as described above and precipitated with methanol (sample B-1) and with hot water (sample B-2).

To the remaining reaction mixture was added 3.44 g. of a 50% sodium hydroxide solution (ten times the estimated phenolic hydroxyl content of the polymer with molecular weight of 20,000 and of the biphenol from the reduction of tetramethyldiphenoquinone, assuming a 2% yield based on the initial 2,6-dimethylphenol). A light green color was noted. After 30 minutes, 1.23 g. acetic anhydride (three times the estimated molar hydroxyl content) was added over a 15 minute period. The light yellow solution was divided into two portions and the polymer was precipitated in the manner described above with methanol (sample C-1) and with hot water (sample C-2).

The discoloration achieved by reduction and capping for the hot water precipitated polymer was determined by measuring their visible spectra. The increase in hydroxyl groups on reduction of carbonyl groups and the decrease on capping was determined by measuring their infrared spectra.

| Sample | Treatment | Visible absorbance* at 422 nm. | IR absorbance** at 3610 cm$^{-1}$ |
|---|---|---|---|
| A-2 | None | 1.83 | 0.19 |
| B-2 | Reduced | .14 | .28 |
| C-2 | Reduced and capped | .04 | .03 |

*g. polymer/l. benzene, 1 cm. path
**0.25 g. polymer/10 ml. CS$_2$, 1 cm. path

The visible light absorption of the methanol precipitated samples were also decreased by reduction and capping. The untreated product A-1 had an absorbance at 422 nm. of 0.12 while both the reduced and reduced and capped samples (B-1 and C-1, respectively) had absorbances of 0.03.

Polyphenylene oxides which are capped in accordance with the process of this invention are substantially free of color bodies, chromophores, or incipient hydroxyl groups, and are substantially resistant to oxidative and/or thermal degradation at elevated temperatures. Accordingly, these polymers after capping may be used to prepare improved articles of manufacture having improved thermal and oxidative stability. These polyphenylene oxides can be employed either alone or in combination with other resins using conventional manufacturing techniques such as molding, vacuum forming extrusion, etc., in the manufacture of articles having improved color oxidation and thermal stability.

The polyphenylene oxides prepared by our invention are particularly well suited for applications requiring excellent electrical insulation, good mechanical properties at elevated temperatures and dimensional stability under conditions of high humidity and mechanical load, including television tuner strips, microwave insulation, coil cores, and transformer housings. In addition, our polyphenylene oxides can be used for a diversity of water-distribution and water-treatment applications including molded parts which require the maintenance of close tolerances in aqueous environments especially during prolonged immersion in water. Additionally, among many others, our polyphenylene oxides can be used in applications requiring service at elevated temperatures, such as in filter stacks, filter discs, and valve seats.

Obviously, other modifications and variations of the present invention are possible in light of the above teachings. It is, therefore, understood that changes may be made in the particular embodiments of the invention described which are within the full intended scope of the invention as defined by the appended claims.

What I claim as new and desire to secure by Letters Patent of the United States is:

1. A process comprising contacting a polyphenylene oxide with a capping agent selected from the class consisting of monoacyl halides of the formula

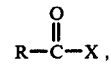

hydrocarbon monosulfonyl halides of the formula R—SO$_2$—X, anhydrides of monocarboxylic acids of the formula

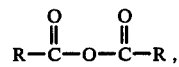

alkyl halides of the formula R-X, dialkyl sulfates of the formula R—O—SO$_2$—O—R, wherein R is alkyl, cycloalkyl, or mixtures thereof, X is chlorine, bromine, fluorine or iodine, wherein the mole ratio of capping agent to hydroxyl group per polymer unit is within the range of from about 0.5:1 to about 10:1 and wherein said contacting is carried out at a temperature within the range of from about 0° to about 100° C. in the presence of (1) a water soluble base selected from the class consisting of alkali metal and alkaline earth metal hydroxide or carbonate bases, (2) a catalytic phase transfer agent, and optionally, (3) an effective organic phase reducing agent.

2. A process comprising contacting a polyphenylene oxide with a capping agent selected from the class consisting of monoacyl halides of the formula

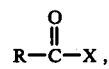

hydrocarbon monosulfonyl halides of the formula R-SO$_2$-X, anhydrides of monocarboxylic acids of the formula

alkyl halides of the formula R—X, dialkyl sulfates of the formula R—O—SO$_2$—O—R, wherein R is alkyl, cycloalkyl, or mixtures thereof, X is chlorine, bromine, fluorine or iodine, wherein the mole ratio of capping agent to hydroxyl group per polymer unit is within the range of from about 0.5:1 to about 1:1 and wherein said contacting is carried out at a temperature within the range of from about 15° to about 80° C. in the presence of (1) a water soluble base selected from the class consisting of alkali metal and alkaline earth metal hydroxide or carbonate bases, (2) a catalytic phase transfer agent, and optionally, (3) an effective organic phase reducing agent.

3. The claim 2 process, wherein the process sequence comprises contacting sequentially the polyphenylene oxide reaction mixture with — first — an effective organic phase reducing agent and a water soluble base, and — second — with a capping agent.

4. The claim 3 process, wherein the amount of capping agent present is an amount sufficient to react with substantially all of the hydroxyl groups contained by polymer units, any unreacted phenolic compounds and other low molecular weight oligomers.

5. The claim 4 process, wherein said polyphenylene oxide is 2,6-dimethyl-1,4-polyphenylene oxide, said catalytic phase transfer agent is selected from quaternary ammonium compounds, quaternary phosphonium compounds, tertiary sulfonium compounds, or mixtures thereof, said base is an alkali metal water soluble base, and said capping agent is acetic anhydride.

6. The claim 4 process, further comprising recovering the resulting capped polyphenylene oxide.

7. The claim 6 process, wherein said recovering is carried out at temperatures within the range of from about 0° to about 50° C.

8. A process in accordance with claim 2, wherein the process sequence comprises contacting sequentially: (1) a polyphenylene oxide reaction mixture and an effective organic phase reducing agent which contains cations selected from quaternary ammonium, quaternary phosphonium and tertiary sulfonium ions and an anion selected from dithionite, dithiosulfate and borohydride ions, (2) a water soluble base, and (3) a capping agent.

* * * * *